United States Patent [19]

Wünsche et al.

[11] Patent Number: 5,393,093
[45] Date of Patent: Feb. 28, 1995

[54] ERECTING MECHANISM FOR A SWIVEL-UP ROLLOVER BAR

[75] Inventors: Martin Wünsche, Althengsfett; Hans Götz, Böblingen; Wolfgang Schwede, Sindelfingen; Karl-Heinz Baumann, Bondorf; Guido Hesse, Sindelfingen, all of Germany

[73] Assignee: Mercedes-Benz AG, Stuttgart, Germany

[21] Appl. No.: 20,777

[22] Filed: Feb. 22, 1993

[30] Foreign Application Priority Data

Feb. 21, 1992 [DE] Germany ............... 4205308

[51] Int. Cl.⁶ ............................................. B60R 21/13
[52] U.S. Cl. ............................................. 280/756
[58] Field of Search ............... 280/756, 753; 296/180.5, 99.1

[56] References Cited

U.S. PATENT DOCUMENTS

| | | | |
|---|---|---|---|
| 4,557,502 | 12/1985 | Scaduto et al. | 280/756 |
| 4,700,982 | 10/1987 | Kuraoka et al. | 280/756 |
| 4,830,402 | 5/1989 | Matthias et al. | 280/756 |
| 5,056,816 | 10/1991 | Lutze et al. | 280/753 |

FOREIGN PATENT DOCUMENTS

| | | | |
|---|---|---|---|
| 454279 | 10/1991 | European Pat. Off. | 280/756 |
| 3732562 | 11/1988 | Germany. | |
| 1599283 | 3/1977 | United Kingdom. | |

OTHER PUBLICATIONS

British Official Novelty Search Report dated 1 Apr. 1993.

Primary Examiner—Eric D. Culbreth
Attorney, Agent, or Firm—Evenson, McKeown, Edwards & Lenahan

[57] ABSTRACT

Erecting mechanism for a swivel-up rollover bar for vehicles, in particular for four-seat convertibles, having a bar leg which is supported in a swivel bearing on one vehicle side and which can be swivelled about a transverse axis of the vehicle and has a supporting section which is remote from the swivelling axis and serves to support the vehicle during a rollover movement the supporting section of the bar leg is swivelled up on a curved path which extends, at least over a partial swivelling angle, around the swivel bearing on a path different from a circular arc by virtue of the fact that the useful length of the bar leg varies with the stroke.

9 Claims, 2 Drawing Sheets

ERECTING MECHANISM FOR A SWIVEL-UP ROLLOVER BAR

BACKGROUND AND SUMMARY OF THE INVENTION

The invention relates to an erecting mechanism for a swivel-up rollover bar for vehicles, in particular for four-seat convertibles, having a bar leg which is supported in a swivel bearing on one vehicle side, which rollover bar can be swivelled about a transverse axis of the vehicle and has a supporting section which is remote from the swivelling axis and serves to support the vehicle during a rollover movement.

German Patent 3,732,562 discloses a U-shaped swivel-up rollover bar, the bar legs of which, which are supported at both sides on in each case one vehicle side in a swivel bearing, can be swivelled about this fixed swivel bearing. In this design of an erecting mechanism, the supporting, swivelled-up bar leg ends and the cross bar connecting them in the transverse direction of the vehicle describe a circular arc about the swivel bearing during their erection movement.

These swivel bearings of the rollover bar are generally provided in the region of the B column, i.e. approximately halfway along the length of the vehicle, since this provides a good possibility for attachment and a possibility for erecting the rollover bar which is functionally sensible. However, structural compromises in the design of the rollover bar become necessary due to the only limited installation space at the edge of a passenger compartment, which is to be as large as possible, and, where relevant, in the vicinity of a vehicle cover member which has been lowered, and, due to these compromises, the optimum erection position for support cannot always be achieved.

An object of the invention is to design an erecting mechanism for a rollover bar of the generic type by means of which the sequence of motions of the rollover bar can be matched to the conditions in the vehicle.

This object is achieved by an arrangement wherein, during the swivelling up of the rollover bar, the supporting section of the bar leg describes a curved path which deviates, at least in a partial range of the swivelling angle, from the path of a circular arc around the swivel bearing by virtue of the fact that the useful length of the bar leg is designed to vary with the stroke.

By means of a superimposed movement about the swivel bearing and in the longitudinal direction of the bar leg, it is possible to move the rollover bar in a manner matched to the installation conditions and, in addition, to adapt it in its swivel-up movement to the requirements for optimum rollover support for the vehicle. It is thereby possible both to install the rollover bar in vehicles with a limited amount of installation space for the rollover bar and to articulate them swivellably at the point in the vehicle where the conditions of support are particularly favorable. By means of this sequence of motions, it would be possible, if required, for the supporting section of the rollover bar to be moved either outside or inside of a circular arc around the swivel bearing in the extended position or to depart from the circular arc around the swivel bearing only during its erection movement, e.g. in order to circumvent a headrest, or to move inside a vehicle cover member or hood.

The control of the bar leg during its swivelling movement can be effected in preferred embodiments by means of a cam which acts on the bar leg in such a way as to displace it in the longitudinal direction. This cam can either be attached at a fixed location and the bar leg moved along it with one end, for example, or be mounted to swivel relative to the bar leg so that a rotation of the cam disc displaces the bar leg in the longitudinal direction.

The design and/or arrangement of the cam relative to the bar leg can be used to effect a large longitudinal adjustment at the beginning of the swivelling movement of the bar leg and a smaller longitudinal adjustment towards the end of the swivelling movement. This ensures, for example, that the rollover bar has already been displaced a considerable way longitudinally in any event if the overturning of the vehicle and support on the supporting section of the bar leg occurs before the bar legs have been swivelled up completely. In the end phase of the swivel-up movement, the return forces which act on the bar legs under load are then only small.

If the swivel bearing is mounted at a fixed location, the bar leg can receive particularly effective support on the vehicle side via the bearing and no additional latching means for the case of loading are necessary to support the swivel bearing.

However, it is likewise possible according to certain preferred embodiments for the bar leg to be mounted in longitudinally displaceable fashion in a bar leg housing swivellable about the swivel bearing since the locking means necessary here for locking the bar leg under load can be provided in the bar leg housing by the already familiar latching means associated with rollover bars. In this case, the cam can then be mounted swivellably on the bar leg housing.

With this erecting mechanism, the rollover bar can be raised either in the longitudinal direction of the vehicle from the vehicle side or, in the form of a U, can span the width of the vehicle with a crossbar and be supported by a bar leg on each vehicle side. On a U-shaped rollover bar arranged in this way, it is possible, if required, to provide in the crossbar a lockable connecting piece which varies the length of the crossbar and by means of which the shape of the rollover bar could, if required, be converted from a U shape to a trapezoidal shape in the raised or lowered position.

Other objects, advantages and novel features of the present invention will become apparent from the following detailed description of the invention when considered in conjunction with the accompanying drawings.

DETAILED DESCRIPTION OF THE DRAWINGS

Figure 1:
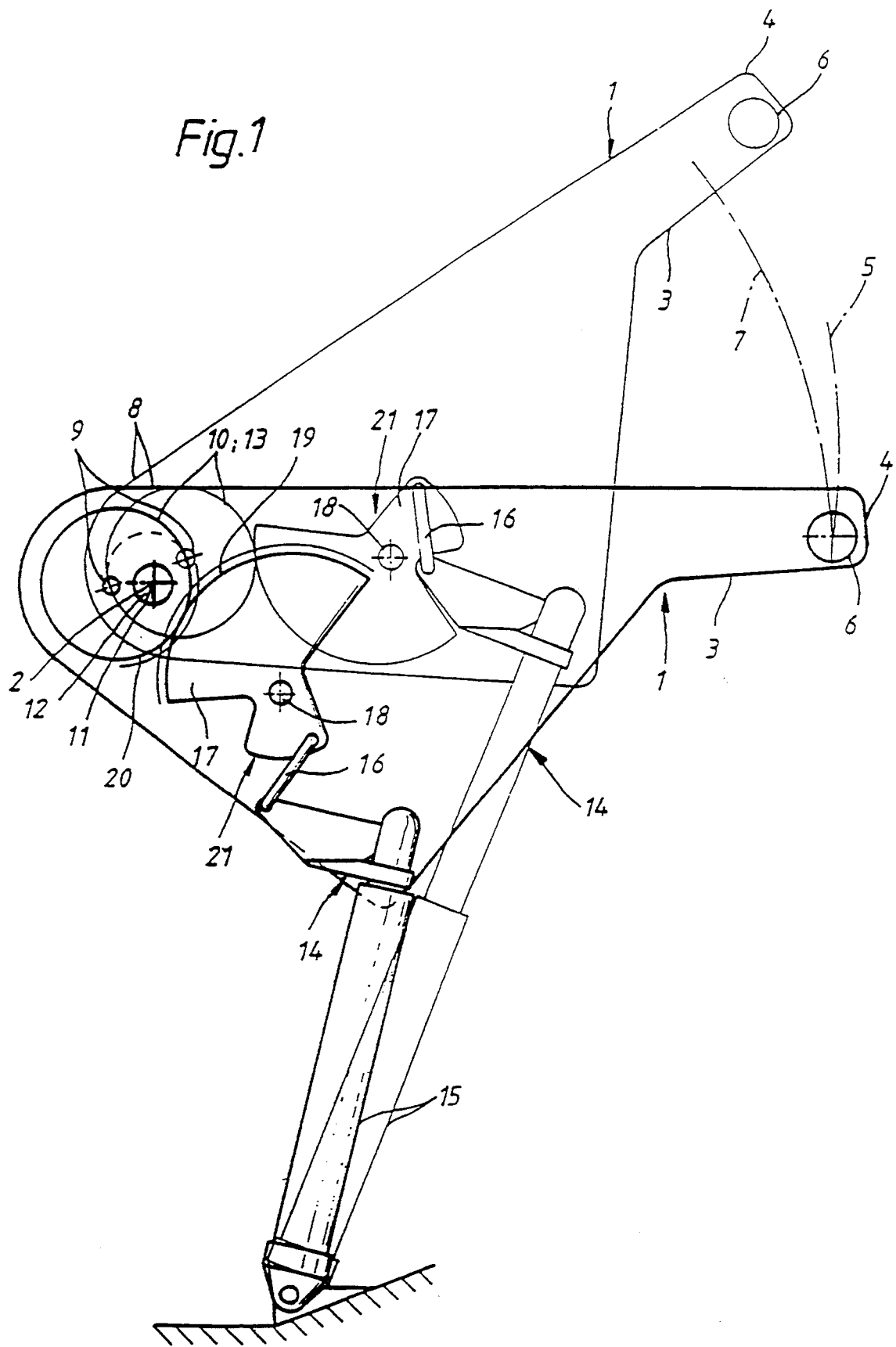
FIG. 1 is a schematic side view showing a leg of a rollover bar which is swivelled by a hydraulic cylinder and is at the same time displaced in the longitudinal direction by an eccentric mounted on the leg, constructed according to a preferred embodiment of the invention.

The drawing figures each show an erecting mechanism for a swivel-up rollover bar 1 or 1' or 1" in a vehicle not shown specifically, the said rollover bar spanning the width of the vehicle in a U-shape. Of this rollover bar, the drawing shows a leg 3 or 3' or 3" which is supported on a vehicle side not shown specifically in a swivel bearing 2 or 2' or 2" and can be swivelled up about a transverse axis of the vehicle, the supporting swivel-up ends 4 or 4' or 4" of the legs on one vehicle side being connected via a crossbar 6 or 6' or 6" which is aligned in the transverse direction of the vehicle, executes a curved path 5 or 5' or 5" during swivelling up and likewise serves to support the rollover movement. However, it would likewise be possible for this erecting mechanism which is to be described to use a rollover bar which is aligned in the longitudinal direction of the vehicle and can be swivelled up out of in each case one vehicle side and retracted into the latter again.

In the case of each of these bar legs 3, 3', 3", the supporting end 4 or 4' or 4" is swivelled up on a curved path 5 or 5' or 5" which does not correspond to a circular arc 7 or 7' or 7" around the swivel bearing 2 or 2' or 2" at least over a partial swivelling angle. This is achieved by the fact that the distance of the supporting end 4 or 4' or 4" of the bar leg 3 or 3' or 3" from the swivel bearing 2 or 2' or 2" is variable and, as a result, a longitudinal movement is superimposed on the swivelling movement of the bar leg 3 or 3' or 3" about the swivel bearing 2 or 2' or 2". It is thereby possible, for example, for the path of the supporting end 4 or 4' or 4" of the bar leg 3 or 3' or 3" to extend on the far side of the circular arc 7 or 7' or 7" around the swivel bearing 2 or 2' or 2" as seen from the swivel bearing 2 or 2' or 2" and for the swivelled-up rollover bar 1 or 1' or 1" to be at a greater distance from the swivel bearing 2 or 2' or 2" than in the lowered position.

In FIG. 1, a cam 10 is fixed on the articulated end 8 of the bar leg 3 via a connecting pin 9, being rotatable about the connecting pin 9, and, in addition, being supported swivellably at a cam bearing point 11 eccentric to this central connecting pin 9, via a pin 12 which is part of the swivel bearing 2, in a receptacle (not shown here) on the vehicle side. This cam 10 is designed as a swivellable eccentric which can be manufactured in a simple manner from a disc 13 mounted eccentrically on the vehicle side via the pin 12. During the swivel-up movement of the bar leg 3, its end 8 articulated in the connecting pin 9 also swivels about the cam bearing point 11, due to the simultaneously effected rotation of the cam 10, as a result of which the distance of the crossbar 6 of the rollover bar 1 from the swivel bearing 2 (the latter coinciding with the cam bearing point 11), is here increased. The cam 8 is swivelled about its cam bearing point 11 by virtue of the swivelling action, via an adjusting lever 16 and an adjusting wheel 17, of a swivel drive 14 giving rise to and supporting the swivelling of the bar leg 3 and comprising a controllable hydraulic cylinder 15 on the cam 10.

The adjusting lever 16 is mounted in articulated fashion on the hydraulic cylinder 15 and on the adjusting wheel 17 and acts on the adjusting wheel 17 during an extension movement of the hydraulic cylinder 15 in such a way that the said wheel swivels about its bearing pin 18 on the bar leg 3, in the anti-clockwise direction in this representation. During this process, the cam 10 is swivelled, via a toothing 19, in the clockwise direction about the swivel bearing 2 by means of the counter toothing 20 and, in the process, takes the bar leg 3 along with it via the connecting pin 9. The adjusting lever 16 and the adjusting wheel 17 are thus parts of an adjusting mechanism 21 for the longitudinal displacement of the rollover bar 1, which mechanism is acted upon concomitantly by the original swivel drive 14. In the raised end position of the rollover bar 1, it is advantageous if the adjusting lever 16 and the adjusting wheel 17 assume a position relative to one another which causes a kind of self locking, this being achievable, for example, by means of an end stop for the swivelling movement of the adjusting wheel 17 or by means of parallel alignment of the adjusting lever 16 relative to the hydraulic cylinder 15, the hydraulic cylinder 15 thereby being supported in its retaining position when subjected to tensile and compressive loading.

The design of the cam 10 and/or the arrangement of the cam 10 and the bar leg 3 can be used to influence the shape of the curved path 5. This makes it possible, for example, for a large longitudinal adjustment to be effected at the beginning of the swivel-up movement of the bar leg 3 and a smaller longitudinal adjustment to be effected towards the end of the swivelling movement, it thereby being possible for an effective supporting height of the upward-swivelling rollover bar i to be reached rapidly with a hydraulic cylinder 15 which extends uniformly. A particular shape of the curved path 5 is also necessary when the movement of the rollover bar 1 has to be matched to a movable vehicle cover member. The possibility of influencing the swivelling movement of the cam 10 as a function of the position of the cover member can be incorporated. This possibility for influencing the curved paths 5 and 5' and 5" can also be achieved analogously by means of the further illustrative embodiments.

Figure 2:
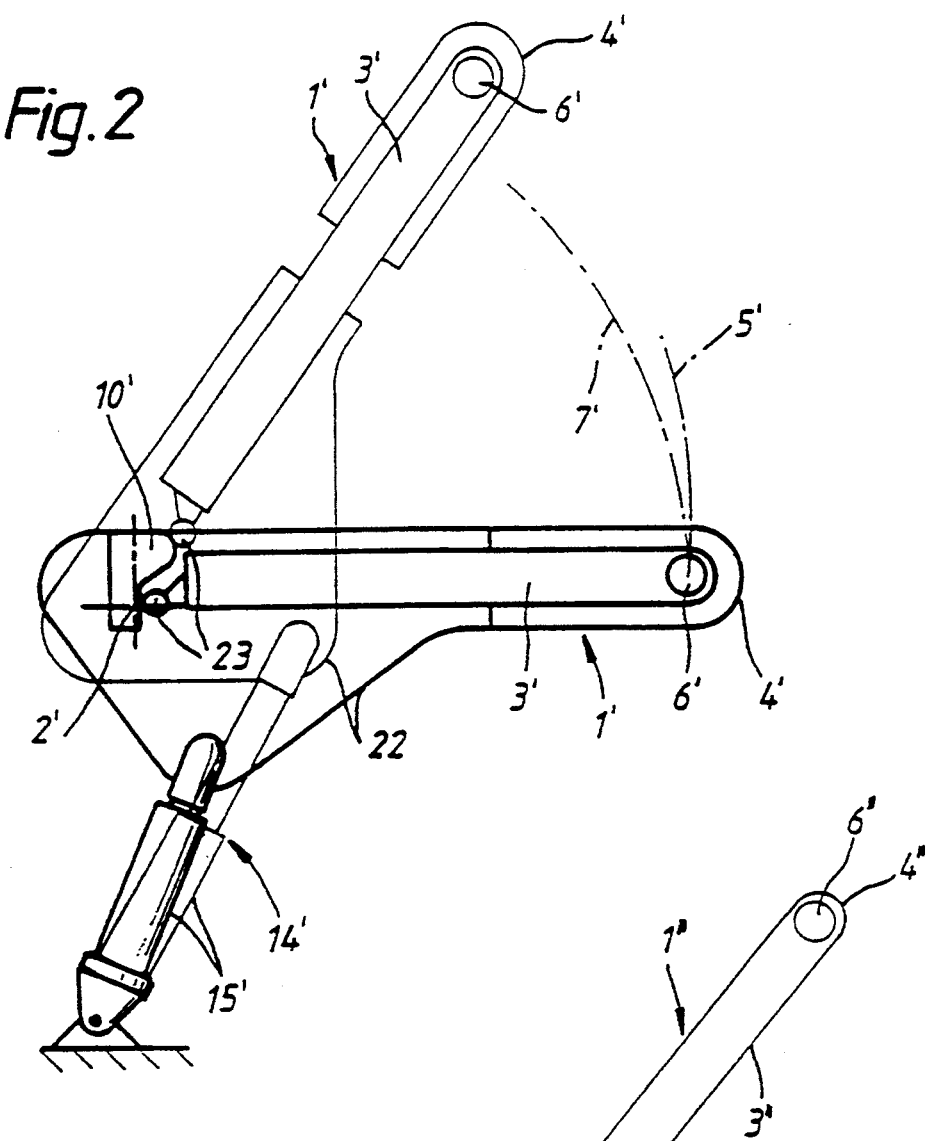
FIG. 2 is a schematic side view showing a sketch of a leg of a rollover bar which is mounted displaceably in a leg housing and, during its erection movement, is extended in the longitudinal direction by a cam fixed on one side of the vehicle, constructed according to another preferred embodiment of the invention.

Thus, in the embodiment of FIG. 2, the cam 10' provided is fixed immovably and at a fixed location on the vehicle side. In addition, a bar leg housing 22 is supported swivellably on a vehicle side in a swivel bearing 2' the said housing accommodating a bar leg 3' in a manner which allows it to be displaced in a longitudinal direction. During the swivelling of the rollover bar 1' about the swivel bearing 2' due to the action of a swivel drive 14' comprising a hydraulic cylinder 15' that end of the bar leg 3' which is accommodated in the bar leg housing 22 travels by means of a rolling-contact element 23 along the contour of the cam 10' as a result of which the bar leg 3' executes a longitudinal displacement in the bar leg housing 22. The curved path 5' which the supporting end 4' of the bar leg 3' here executes together with the crossbar 6' connecting the bar legs 3' on both sides depends on the design of the cam 10' and deviates from a circular arc 7' around the swivel bearing 2'. A controllable latching device already known for rollover bars can be provided to support the extended bar leg 3' in the bar housing 22 when the rollover bar 1' is loaded, the said latching device holding the bar leg 3' in its instantaneous position in the bar leg housing 22 in addition to the support provided for it on the cam 10'.

Figure 3:
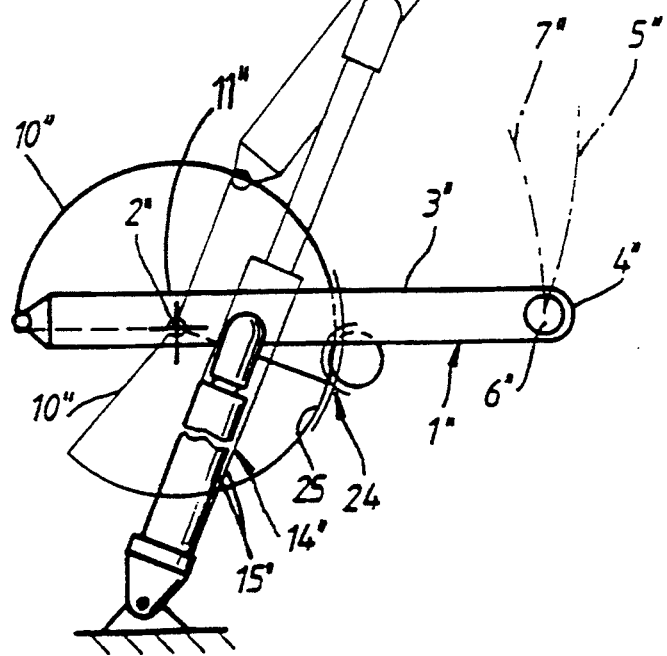
FIG. 3 is a schematic side view showing a leg articulated on a cam and forming part of a rollover bar which can be displaced in the longitudinal direction during its erection movement by means of the swivellable cam, constructed according to another preferred embodiment of the invention.

FIG. 3 shows the bar leg 3" of a rollover bar 1" which is supported swivellably on a cam 10" which, in turn, is fixed in a swivel bearing 2" on one vehicle side. The bar leg 3" is swivelled by the action of a swivel drive 14", which here comprises a hydraulic cylinder 15" and the distance of its supporting section 4" with the crossbar 6" from the swivel bearing 2" is adjusted by a simultaneous rotation of the cam 10" about a cam bearing point 11" which coincides with the swivel bearing 2" as a result of which the crossbar 6" describes a curved path 5" which deviates from a circular arc 7" around the swivel bearing 2". A longitudinal adjustment of the bar leg 3" and a rotation, necessary for this purpose, of the cam 10" is here effected by means of a drive 24, which is indicated, which can, for example, act on a circumferential toothing 25 of the cam 10" and support the latter in its rotational position.

In the case of a U-shaped rollover bar, the crossbar of which spans the vehicle in the transverse direction, it is conceivable that the U shape of the rollover bar be matched to the structural conditions of the vehicle, although this does not necessarily correspond to the best conditions of support by the rollover bar. It would be possible in this context to provide a trapezoidal shape of the rollover bar in the lowered position, this being altered in the swivelled-up position to give a U by arranging in the crossbar a lockable connecting piece which varies the length of the crossbar.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Erecting mechanism for a swivel-up rollover bar for vehicles having a bar leg which is supported in a swivel bearing on one vehicle side, said bar leg being swivellable about a transverse axis of the vehicle and having a supporting section remote from its swivelling axis which serves to support the vehicle during a rollover movement, wherein the bar leg is supported by a support assembly such that, during swivelling-up of the rollover bar to a vehicle supporting position, the supporting section of the bar leg describes a curved path which deviates from a circular arc around the swivelled bearing at least over a partial range of its swivelling angle to thereby change the effective length of the bar leg with respect to a vehicle structure in response to its swivel position, and wherein said supporting structure includes a cam driven swivellably about a cam bearing point and serving to displace the bar leg in a longitudinal direction of the bar leg, wherein the cam is formed by an eccentrically swivel-mounted disc.

2. Erecting mechanism for a swivel-up rollover bar for vehicles having a bar leg which is supported in a swivel bearing on one vehicle side, said bar leg being swivellable about a transverse axis of the vehicle and having a supporting section remote from its swivelling axis which serves to support the vehicle during a rollover movement, wherein the bar leg is supported by a support assembly such that, during swivelling-up of the rollover bar to a vehicle supporting position, the supporting section of the bar leg describes a curved path which deviates from a circular arc around the swivelled bearing at least over a partial range of its swivelling angle to thereby change the effective length of the bar leg with respect to a vehicle structure in response to its swivel position, and wherein said supporting structure includes a cam driven swivellably about a cam bearing point and serving to displace the bar leg in a longitudinal direction of the bar leg, wherein the cam is mounted swivellably on the swivel bearing of the bar leg.

3. A retractable roll bar assembly for vehicles, comprising:
    a bar leg disposable at a vehicle side,
    a swivel bearing at the vehicle side supporting the bar leg for pivotal movement about a pivot axis through the swivel bearing,
    said bar leg exhibiting a supporting section remote from the pivot axis for supporting a vehicle during a rollover movement,
    and a support assembly for the swivel bearing which changes the useful length of the bar leg by moving the swivel bearing in response to swiveling movement of the bar leg so that the bar leg supporting section travels in a curved path which includes non-circular arc portions,
    wherein the support assembly includes a cam driven swivellably about a cam bearing point to displace the bar leg in a longitudinal direction of the bar leg,
    wherein the cam is formed by an eccentrically swivel-mounted disc.

4. A retractable roll bar assembly for vehicles according to claim 3, wherein the swivel bearing is mounted at a fixed location relative to vehicle side structure when the swivel bearing is in an initial roll bar retracted position.

5. A retractable roll bar assembly for vehicles according to claim 3, wherein the cam is connected to the bar leg.

6. A retractable roll bar assembly for vehicles according to claim 5, wherein on each vehicle side, a rollover bar has a bar leg which is supported in a swivel bearing and the supporting ends of which are connected via a crossbar which is aligned in the transverse direction of the vehicle, and wherein each of the bar legs is supported by the support assembly to move along similar curved paths while supporting the roll bar movement.

7. A retractable roll bar assembly for vehicles according to claim 3, wherein the cam is mounted swivellably on the swivel bearing of the bar leg.

8. A retractable roll bar assembly for vehicles according to claim 3, wherein the support assembly includes an adjusting mechanism acted upon by a swivel drive of a rollover bar.

9. A retractable roll bar assembly for vehicles according to claim 3, wherein on each vehicle side, a rollover bar has a bar leg which is supported in a swivel bearing and the supporting ends of which are connected via a crossbar which is aligned in the transverse direction of the vehicle, and wherein each of the bar legs is supported by the support assembly to move along similar curved paths while supporting the roll bar movement.

* * * * *